(12) United States Patent
Goto et al.

(10) Patent No.: US 11,241,713 B2
(45) Date of Patent: Feb. 8, 2022

(54) DECORATED-PART HAVING A FINE DECORATION USING A LASER PROCESSED GROOVE

(71) Applicant: TRINITY INDUSTRIAL CORPORATION, Aichi (JP)

(72) Inventors: Yukihiro Goto, Aichi (JP); Tadayuki Mizobe, Aichi (JP); Tokinobu Shimada, Aichi (JP)

(73) Assignee: TRINITY INDUSTRIAL CORPORATION, Aichi (JP)

( * ) Notice: Subject to any disclaimer, the term of this patent is extended or adjusted under 35 U.S.C. 154(b) by 0 days.

(21) Appl. No.: 15/928,256

(22) Filed: Mar. 22, 2018

(65) Prior Publication Data

US 2018/0281016 A1 Oct. 4, 2018

(30) Foreign Application Priority Data

Mar. 29, 2017 (JP) .............................. JP2017-065438

(51) Int. Cl.
*B05D 3/06* (2006.01)
*B23K 26/364* (2014.01)
(Continued)

(52) U.S. Cl.
CPC .............. *B05D 3/06* (2013.01); *B05D 5/061* (2013.01); *B05D 7/02* (2013.01); *B23K 26/355* (2018.08);
(Continued)

(58) Field of Classification Search
CPC . B05D 3/06; B05D 5/061; B05D 7/02; B05D 7/54; B23K 26/359; B23K 26/355;
(Continued)

(56) References Cited

U.S. PATENT DOCUMENTS 4,391,764 A * 7/1983 Edinger ................... C08K 3/04
219/121.6
5,061,341 A * 10/1991 Kildal ..................... B23K 26/18
216/65
(Continued)

FOREIGN PATENT DOCUMENTS

JP 2010-063993 3/2010

*Primary Examiner* — Michael Zhang
(74) *Attorney, Agent, or Firm* — Clark & Brody LP

(57) ABSTRACT

This invention provides a method for manufacturing decorated-parts of high design-quality and reliability, since the exposed surface of the base coat-layer is not bulged, and thus the color of said coat-layer is distinct. The method for manufacturing decorated-parts of this invention comprises a base coat-layer-forming process, a surface coat-layer-forming process and a laser-decorating process. In the base coat-layer-forming process, a resin-base material of a highly light color at a lightness-level of 70 or more or a clear and colorless resin base-material is formed. In the surface coat-layer forming process, the surface coat-layer of a less-bright color at a lightness-level of 20 or less is formed on the base coat-layer. In the laser-decorating process, the first laser-processed groove penetrating the surface coat-layer and exposing partially the base coat-layer is made by irradiating the infrared laser onto such surface coat-layer, thus providing a fine decoration onto the surface of said decorated-part.

4 Claims, 6 Drawing Sheets

(51) Int. Cl.
      *B05D 7/02*        (2006.01)
      *B23K 26/352*    (2014.01)
      *B23K 26/359*    (2014.01)
      *B05D 5/06*        (2006.01)
      *B05D 7/00*        (2006.01)
      *B60R 13/00*     (2006.01)
      *B60N 2/75*      (2018.01)
      *B23K 103/16*    (2006.01)

(52) U.S. Cl.
      CPC .......... *B23K 26/359* (2015.10); *B23K 26/364* (2015.10); *B05D 7/54* (2013.01); *B23K 2103/172* (2018.08); *B60N 2/75* (2018.02); *B60R 13/00* (2013.01)

(58) Field of Classification Search
      CPC ............ B23K 26/364; B23K 2103/172; B60R 13/00; B60N 2/75; B44C 1/228; B41M 5/24
      See application file for complete search history.

(56) References Cited

U.S. PATENT DOCUMENTS

| | | | |
|---|---|---|---|
| 6,169,266 B1* | 1/2001 | Hughes | B41M 5/24 |
| | | | 219/121.68 |
| 2013/0270269 A1* | 10/2013 | Lewis | B41M 5/24 |
| | | | 220/270 |
| 2015/0166844 A1* | 6/2015 | Clarke | B29B 11/12 |
| | | | 428/43 |

\* cited by examiner

DECORATED-PART HAVING A FINE DECORATION USING A LASER PROCESSED GROOVE

TECHNICAL FIELD

This invention relates to a decorated-part of which fine decorations are provided on the surface thereof by irradiating a laser onto the coat-layer of such part and also relates to a method for manufacturing said part.

TECHNICAL BACKGROUND

In the field of automobile interior-parts or the like, the decorated-parts (e.g. console boxes, instrument panels, armrests or the like) of which a decoration such as a letter, a design or the like is added onto a coat-layer laminated onto the surface of a resin base-material for the purpose of improving the designs and product quality, are nowadays put to practical use.

A method for manufacturing such decorated-parts, as disclosed for example in Patent Document 1, is publicly known. This document shows a method for initially making a laminated coat-layer of a color that gets darker toward the bottom layer of such a coat-layer, and shows a method for drawing a design representing a wood-grain pattern by selectively laser processing such a laminated coat-layer in differing depths. Such laser processing preferably is executed by using a comparatively inexpensive infrared laser-processing device (e.g. of a laser wavelength of 1,064 nm).

PRIOR ARTS

Patent Documents

Patent Document 1: Japanese published unexamined application number 2010-63993

SUMMARY OF THE INVENTION

Problems to be Resolved by the Invention

Regarding automobile interior parts, it is common, in consideration of design effect and cost efficiency, to make the resin base-material of a deep color such as black or the like, and it is also general to make the surface coat-layer of a similar color (usually black) according to the color of the resin base-material. In the case that such a structure is applied, decoration is added onto the surface of said interior-parts by providing a fine laser-process on the black surface of the coat-layer. In doing so, there is the advantage that it is easy to provide infrared-laser processing onto the black surface of such a coat-layer. Contrarily, there is the disadvantage that it is impossible to express a chromatic color. The inventors of this invention are considering a new decorative-method of which a base coat-layer of high brightness and of high saturation, e.g. a chromatic color such as red or the like, is provided on the bottom level of the black surface of the coat-layer. Then, a laser-processed groove can be formed on just the surface coat-layer to expose such a chromatic-colored base coat-layer, thus partially providing a vivid accent on said black base.

However, in removing the black surface coat-layer by laser-processing causes the problem that the resin base-material that is of a deep color such as black or the like to absorb the laser-light energy, thus causing the resin on the surface of such base material to be gasified into an air-foam, thus forming a bulge on the surface of such base coat-layer. In which case, the reflectance of the base coat-layer is reduced, because the flatness of the base coat-layer is is not realized, and the incoming air makes the base coat-layer to become cloudy or the like with an indistinct coloring and insufficient color contrast, thus presumably making it difficult to achieve a decorated-part of an excellent design. Also, the adhesion of the base coat-layer against the resin base-material is reduced, thus presumably making it difficult to achieve a reliable decorated-part.

This invention was achieved in light of the aforementioned problems and is aimed in providing a decorated part with a high design-quality and reliability, since the base coat-layer exposed on the surface of such coat-layer has no bulge, and thus the color of such coat-layer is distinctive.

Means of Solving the Problems

To solve the above-mentioned problems, the first aspect of this invention refers to a method for manufacturing a decorated-part of which at least one layer of the base coat-layer that is colored in a chromatic color on the surface of the resin base-material, of which the surface coat-layer that is colored in a less bright color than that of the base coat-layer formed on the base coat-layer, and of which a fine decoration is provided on the surface of such decorated part by laser irradiation onto the surface coat-layer, and is characterized in comprising a base coat-layer-forming process for forming at least one layer of the base coat-layer onto the surface of the resin-base material while preparing the resin base-material that is colored at a high-lightness level of 70 or more or a clear and colorless resin-base material; and in comprising a surface coat-layer-forming process for forming the surface coat-layer that is colored at a lower-lightness level of 20 or less on the base coat-layer; and comprising a laser-decorating process of which the infrared-laser is irradiated onto the surface coat-layer through the surface coat-layer so as to make a first laser-processed groove that partially exposes the base coat-layer, thus providing a fine decoration onto the surface of said decorated-part.

As such, in the first aspect of this invention, the laser-decorating process allows for irradiating the infrared laser onto the surface coat-layer, which partially removes the surface coat-layer so as to make the first laser-processed groove thereon, thus exposing the base coat-layer at the place corresponding to the first laser-processed groove. Here, the resin base-material, colored at a high-lightness level of 70 or more, or a clear and colorless resin-base material, is used that does not readily absorb the heat in the laser-decorating process, and that the resin is not gasified, and that therefore an air-foam-induced bulge is not readily formed. As such, the flatness of the area of the base coat-layer exposed at the first laser-processed groove is realized, and the color of such area becomes distinctive, and the contrast becomes greater, thus making it possible to obtain a decorated part of an excellent design-quality. Furthermore, the adhesion of the base coat-layer against the resin base-material does not lessen, thus making it possible to obtain a reliable decorated-part.

The second aspect of this invention refers to the preparation of the resin base-material colored in white, milky-white, grayish-white or ivory with a lightness level of 70 or more in the base coat-layer-forming process of the first aspect of this invention.

The third aspect of this invention refers to the step that the second laser-processed groove of a shallower depth than that of the first laser-processed groove, and which does not penetrate the surface coat-layer, is also made on the surface of the coat-layer in the first or second aspect of this invention.

Therefore, the third aspect of this invention allows for the adding of the second laser-processed groove so that a complex and fine design can be expressed, thus making it possible to improve the excellency of the design.

The fourth aspect of this invention refers to a step that the second laser-processed groove is formed after the formation of the first laser-processed groove in the laser decorating process of the third aspect of this invention.

If the second laser-processed groove of a relatively shallow groove is made first, and the first lase-processed groove of a relatively deep groove is made later, then much gas is produced in the making of the first laser-processed groove, which induces soot and smoke to gather in the second laser-processed groove, which could result in less gloss of the second laser-processed groove. Contrarily, the fourth aspect of this invention, about the first laser-processed groove being firstly made, stops smoke and soot from gathering in the second laser-processed groove, which eliminates the possibility of gloss deterioration, thus making it possible to obtain a decorated-part of a high quality-design.

The fifth aspect of this invention refers to a decorated-part of which a fine decoration is provided on the surface thereof by the laser-processed groove comprising a resin base-material colored at a high-lightness level of 70 or more or alternatively comprising a clear and colorless resin base-material; and comprising at least one base coat-layer colored in a chromatic color formed on the surface of the resin base-material; and comprising a surface coat-layer colored at a low-lightness level of 20 or less, which is formed on the base coat-layer; and is further characterized in comprising a first laser-processed groove that goes through the surface coat-layer and partially exposes the base coat-layer whereof the roughness (Ra) of the exposed area, which is at the bottom of the first laser-processed groove of the base coat-layer, is 2 µm or less.

Thus, the fifth aspect of this invention, whereof the roughness (Ra) of the exposed area of the base coat-layer exposed in the first laser-processed groove is 2 µm or less, which makes the flatness of such area realized, the color of such an area becomes distinctive, and the contrast becomes greater, thus making it possible to obtain a decorated-part with a excellent design-quality. Furthermore, the adhesion of the base coat-layer against the resin base-material does not lessen, thus making it possible to obtain a reliable decorated-part.

Hence, the above statement "the roughness (Ra) of the exposed area of the base coat-layer exposed at the bottom of the first laser-processed groove is 2 µm or less" is defined that the arithmetic-average roughness (Ra) of such exposed area of such base coat-layer, which is measured by using a laser microscope, as being 100 µm in length in the transverse direction of the first laser-processed groove, is 2 µm or less. Also, the maximum height (Ry) of the exposed area of the base coat-layer can be 7 µm or less, and the 10-point average roughness (Rz) of such exposed area of such base coat-layer can be 8 µm or less. The reason for such a definition is that if the values of Ra, Ry and Rz exceed the above-mentioned ranges, the exposed area is not truly flat, which makes it difficult to achieve a preferable exposed area with distinctive coloring and great contrast.

The sixth aspect of this invention refers to the resin base-material according to the above fifth aspect of this invention that is colored in white, milky-white, grayish-white or ivory at a lightness-level of 70 or more.

The seventh aspect of this invention refers to the existence of a non-exposed area that is not at the bottom of the first laser-processed groove on the base coat-layer of the fifth or sixth aspect of this invention, as well as to the average value in the height from the surface of the resin base-material as the standard point up to the surface of the exposed area is 100 or more and 130 or less under the condition that the average value in the height from the standard point, that is, from the surface of the resin base-material up to the surface of the non-exposed area, is 100.

As such, regarding the seventh aspect of this invention, if the average value in the height up to the surface of the exposed area is within the above range, under the condition that the average value in the height up to the surface of the non-exposed area is 100, the height of the bulge of the exposed area is less, and then the flatness of the exposed area is realized, which makes the color of such an area distinctive and the contrast greater, thus making it possible to obtain a decorated-part with an excellent design-quality. Furthermore, the adhesion of the base coat-layer against the resin base-material does not lessen, thus making it possible to obtain a reliable decorated-part.

The eighth aspect of this invention refers to the base coat-layer that is colored in a chromatic color at a lightness-level of 30 or more and at a chromatic value of 40 or more.

As such, the eighth aspect of this invention that the lightness and chromatic value of the base coat-layer are within the above ranges, allows for a secure formation of the exposed area with distinctive coloring and great contrast. It is preferable that the base coat-layer is colored in a chromatic color at a lightness level of 30 or more and at a chromatic value of 45 or more, most preferably at a lightness level of 35 or more and at a chromatic value of 50 or more.

The ninth aspect of this invention refers to the thickness of the surface coat-layer that is greater than that of the base coat-layer according to any one of the sixth through eighth aspects of this invention.

Making the thickness of the surface coat-layer less than that of the base coat-layer may inhibit the function of the surface coat-layer as being a sufficient protective layer on the uppermost surface of the surface coat-layer. In addition, the thickness of the base coat-layer should be minimal, since the base coat-layer is simply for providing contrast. Increasing the thickness of the base coat-layer may unnecessarily result in higher costs in production. On the contrary, the ninth aspect of this invention, that the thickness of the surface coat-layer is greater than that of the base coat-layer, can provide the function of the surface coat-layer as being a protective layer on the uppermost surface of the surface coat-layer and can also prevent an increase of unnecessary thickness of the base coat-layer, thus making it possible to avoid higher costs in production. Therefore, the thickness of the surface coat-layer should be 20 µm to 40 µm, and the thickness of the base coat-layer should be 10 µm to 20 µm.

The tenth aspect of this invention refers to the second laser-processed groove, according to any one of the sixth through the ninth aspects of this invention, which is of a shallower groove than the first laser-processed groove and which does not penetrate the surface coat-layer.

The tenth aspect of this invention adds the second laser-processed groove that can express a more complex and finer design, thus making it possible to improve the design-quality.

The eleventh aspect of this invention refers to the structure, according to the tenth aspect of this invention, that the width of the first laser-processed groove is greater than that of the second laser-processed groove.

In making both the first and second laser-processed grooves, making the width of the first laser-processed groove narrower than that of the second laser-processed groove makes it difficult to make the first laser-processed groove. More likely, the base coat-layer makes it impossible to provide contrast in coloring. On the contrary, the ninth aspect of this invention makes it easy to make both the first and second laser-processed grooves. Then, the base coat-layer can provide sufficient contrast in coloring, thus improving design-quality.

Effects of the Invention

As described above, the first through fourth aspects of this invention make the base coat-layer, exposed at the surface coat-layer, free of a bulge and makes the coloring distinctive, thus making it possible to provide a method for manufacturing a reliable decorated-part of a high-quality design in a relatively easy and inexpensive way. Also, the fifth through eleventh aspects of this invention make the base coat-layer, exposed at the surface coat-layer, free of a bulge and makes the coloring distinctive, thus making it possible to provide a reliable decorated-part of an excellent design-quality.

MODES FOR CARRYING OUT THE INVENTION

Hereinafter, an embodiment of this invention showing an automobile interior-part and a method for manufacturing the same is precisely described in reference to FIGS. 1 to 10.

Figure 1:
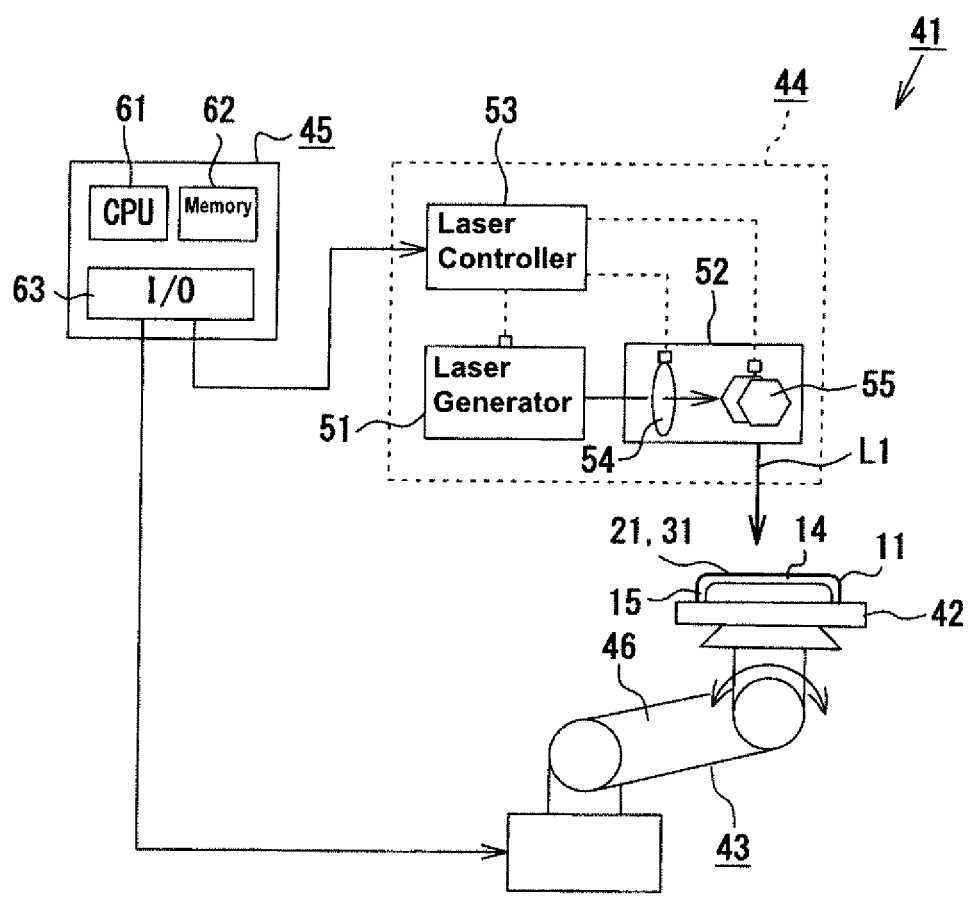
FIG. 1 is a layout-sketch of the laser-decorating device as an embodiment of this invention.
Figure 2:
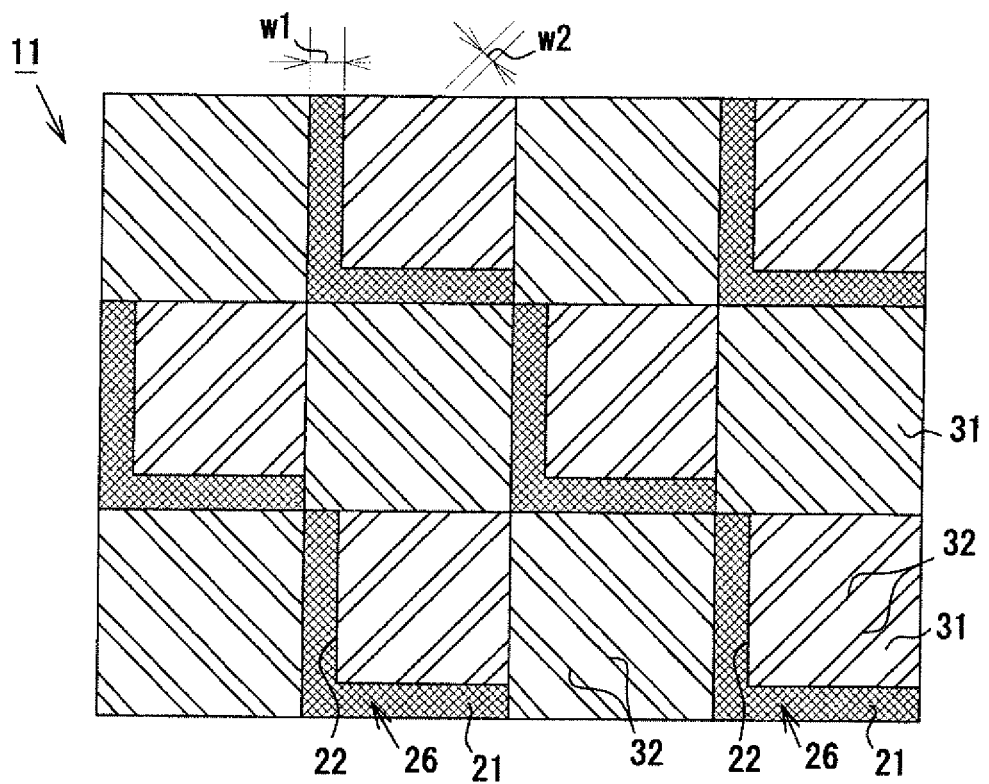
FIG. 2 is a partially enlarged plan-view of the automobile interior-part as an embodiment of this invention.
Figure 3:
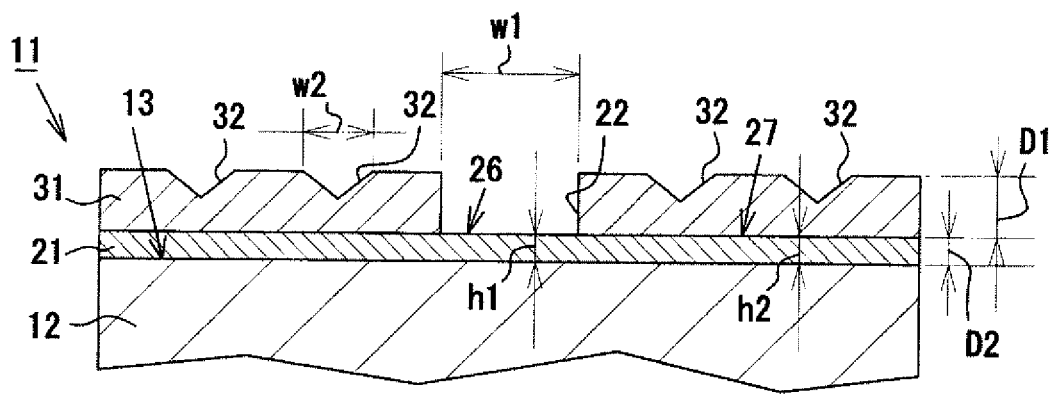
FIG. 3 is the enlarged cross-sectional view of the main part of the automobile interior-part as an embodiment of this invention.

As shown in FIGS. 2 and 3, the automobile interior-part 11 (i.e. the decorated part) of this invention comprises a three-dimensional resin-base material 12 and a plurality of coat-layers (base coat-layer 21, surface coat-layer 31) formed in a laminated fashion so as to cover the surface 13 of the resin base-material 12. The resin base-material 12 as the embodiment of this invention is described as comprising a flat-shaped main part 14 and a pair of side parts 15 set so as to connect to the flat-shaped main part 14 (see FIG. 1). Since the angle between the main part 14 and the pair of side parts 15 is approximately 90 degrees, this resin base-material 12 is of substantially a U-shaped form. The automobile interior-part 11 as the embodiment of this invention is a part for configuring e.g. an armrest of an automobile door.

The resin base-material 12 as the embodiment of this invention is made of a resin-material colored in a highly light color at a lightness-level of 70 or more (specifically, of a white-resin material at a lightless-level of 80 or more; of a milky-white resin-material at a lightness-level of 70 or more; of a grayish-white resin-material at a lightness-level of 70 or more; or made of an ivory-resin material colored at a lightness level of 70 or more); or made of a clear and colorless resin-material. As such, this base material 12 is made of a resin-material that contains little or no dark-colored pigment such as carbon-black or the like. Here, the resin base-material 12 formed by using a natural ABS resin containing no pigment (a milky-white at a lightness-level of 90 or the like) is used. Also, e.g. a natural PC resin (clear and colorless) containing no pigment can be used, or it is possible to use a resin base-material (of a shade of color between milky white and clear and colorless) as a mixture of the ABS resin and PC resin, as described above. For the above coloring designation of the resin base-material 12, "a highly light color at a lightness level of 70 or more" and not only a non-chromatic color is used. Yet, a slightly chromatic color can be used.

The base coat-layer 21, colored in a chromatic color except in black and white, is formed on the surface 13 of the resin base-material 12. Specifically, the base coat-layer 21 is colored in red by adding a red pigment, and, as the embodiment of this invention, is colored in red at a lightness-level of about 90 and at the chromatic-value of about 90.

The surface coat-layer 31, colored in a low-light color at a lightness-level of 20 or less, is formed on the base coat-layer 21. Specifically, by adding carbon black as a black pigment (of a content of four percent per volume or more), the surface coat-layer 31, colored in black at a lightness-level of about 18 and at the chromatic-value of about 2, is formed. The surface coat-layer 31 is colored by using a black pigment for the embodiment of this invention, but a dark color other than black (e.g. a blackish green, a blackish brown or the like) can be used if the condition of the lightness-level being 20 or less is satisfied. Specifically, it is possible to color the surface coat-layer 31 by mixing a black pigment with a dark chromatic color pigment other than black, accordingly.

The thickness of the surface coat-layer 31 is set greater than that of the base coat-layer 21. Specifically, the former should be 20 µm to 40 µm (approximately 30 µm for the embodiment of this invention), and the latter should be 10 µm to 20 µm (approximately 15 µm for the embodiment of this invention). Making the thickness of the surface coat-layer 31 less than that of the base coat-layer 21 may inhibit the function of the surface coat-layer 31 as being a sufficient protective-layer on the uppermost surface of the surface coat-layer 31. In addition, the thickness of the base coat-layer 21 should be minimal, since the base coat-layer 21 is simply for providing contrast in coloring. Also, increasing the thickness of the base coat-layer 21 unnecessarily may result in higher costs in production.

As shown in FIGS. 2 and 3, a plurality of two different laser-processed grooves 22, 32 respectively are formed in the surface coat-layer 31 as the embodiment of this invention. Specifically, as shown in FIG. 2, two rectangular-shaped patterns are drawn on the surface of the surface coat-layer 31. One of two such patterns incorporates both of the two different laser-processed grooves 22, 32, with a plurality of second laser-processed grooves 32 therein drawn in parallel obliquely upward to the right. The other drawn pattern incorporates only the one type of laser-processed grooves 32 that is drawn therein in parallel obliquely upward to the left. Also, these two drawn patterns are alternately provided.

As shown in FIG. 3, the first laser-processed groove 22 fully penetrates the surface coat-layer 31 to expose partially the surface of the base coat-layer 21 that is red in color. The first laser-processed groove 22 as the embodiment of this invention is formed L-shape in planar view. On the other hand, the second laser-processed groove 32 is shallower than the first laser-processed groove 22 and is formed so as not to penetrate the surface coat-layer 31. Specifically, the depth of the first laser-processed groove 22 is 20 µm to 40 µm (approximately 30 µm for the embodiment of this invention), and the depth of the second laser-processed groove 32 is 5 µm to 15 µm (approximately 10 µm for the embodiment of this invention). Also, the width w1 of the first laser-processed groove 22 is greater than the width w2 of the second laser-processed groove 32. Specifically, the width of the former should be set at 80 µm to 150 µm (approximately 100 µm, for the embodiment of this invention), and the width of the latter should be set at 50 µm to 100 µm (approximately 70 µm for the embodiment of this invention).

The exposed surface-area 26 of the base coat-layer 21 at the bottom of the first laser-processed groove 22 is relatively flat, and its arithmetic-average roughness (Ra) is 2 µm or less. The maximum height (Ry) of the exposed area 26 is 7 µm or less, and the 10-point average roughness (Rz) of said exposed area 26 is 8 µm or less. The non-exposed area 27 of the base coat-layer 21 not at the bottom of the first laser-processed groove 22, is of average value in height h1 from the standard point, that is, from the surface 13 of the resin base-material 12 up to the surface of the exposed area 26, is 100 or more and 130 or less, under the condition that the average value in height h2 from the standard point, that is, from the surface 13 of the resin base-material 12 up to the surface of the non-exposed area 27 is 100.

FIG. 1 shows the laser-decorating device 41 used in providing a design on the pre-decorated automobile interior-part 11. Such laser-decorating device 41 as the embodiment of this invention comprises a supporting table 42 for supporting the automobile interior-part 11; a work-displacement robot 43 for moving the supporting table 42 to change the posture and position or the like of said automobile interior-part 11; a laser-irradiating device 44 for irradiating the infrared laser L1 onto the decorated-surface of the automobile interior-part 11; and a control device 45.

The work-displacement robot 43 comprises a robot arm 46 with a supporting table 42 at the tip. Of the work-displacement robot 43, the robot arm 46 is activated to move the supporting table 42 from side to side, up and down and in a rotational direction to change the position and posture of the automobile interior-part 11, thus changing the irradiation position and irradiation angle of the infrared laser L1 against the decorated-surface of the automobile interior-part 11.

The laser-irradiating device 44 comprises a laser generator 51 for generating the infrared laser L1 at a given wavelength (e.g. a $YVO_4$ laser of a wavelength of 1,064 nm); a laser deflector 52 for deflecting the infrared laser L1; a laser controller 53 for controlling the laser generator 51 and the laser deflector 52. The laser deflector 52 is an optics system comprising a lens 54 and a reflective mirror 55. The irradiation position and the focal point of the infrared laser L1 can be adjusted by changing the position of the lens 54 and the reflective mirror 55. The laser controller 53 controls the laser generator 51 and the laser deflector 52, thus adjusting the laser-irradiation conditions such as the irradiation intensity and the scanning rate of the infrared laser L1.

The controller 45 is configured of a well-known computer made of a CPU 61, of a memory 62, and of an input-output port 63 or the like. The controller 45 is connected electrically to the work-displacement robot 43 and the laser-irradiating device 44 that are driven and controlled by various drive-signals.

The memory 62 of the controller 45 incorporates programs and data for drawing the design onto the decorative surface of the automobile interior-part 11. Specifically, such data is configuration-data for indicating the three-dimensional formation of the automobile interior-part 11 and other data such as pattern-data or the like according to the pattern to be drawn onto said automobile interior-part 11. Also, the memory 62 incorporates the programs and the data for controlling the work-displacement robot 43 and the laser-irradiating device 44.

The method for manufacturing the automobile interior-part 11 is described in reference to FIGS. 4 to 7.

Figure 4:
FIG. 4 is the enlarged cross-sectional view of the main part that explains the manufacturing process of the automobile interior-part as an embodiment of this invention.
Figure 5:
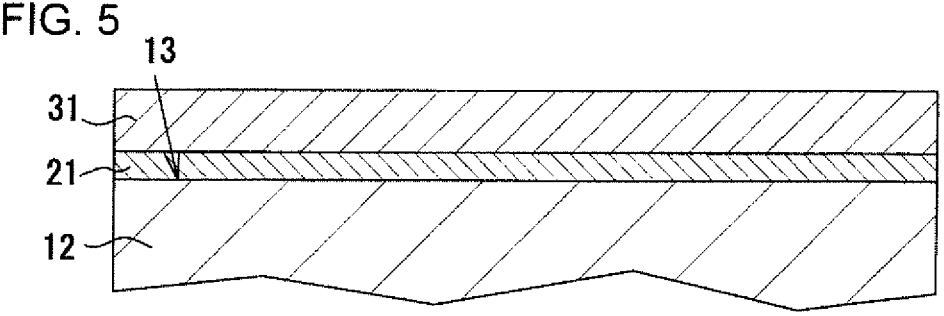
FIG. 5 is the enlarged cross-sectional view of the main part that explains the manufacturing process of the automobile interior-part as an embodiment of this invention.

Firstly, prepare the resin base-material formed by using the ABS resin base-material colored in white at a lightness-level of 80 or more or colored in a milky-white at a lightness-level of 70 or more or colored in a grayish-white or in ivory, or alternately prepare a clear-and-colorless resin base-material (see FIG. 4). Then, make the base coat-layer 21 on the surface 13 of the resin base-material 12 by the conventionally known method (see FIG. 5 of the base coat-layer-forming process). After that, make the surface coat-layer 31 in a less-light color at a lightness-level of 20 or less, on the base coat-layer 21 (see FIG. 5 of the surface coat-layer-forming process), so that the whole area of the surface 13 of the three-dimensional resin base-material 12 (of the main part 14 and of the side parts 15) becomes a decorative surface.

In the next laser-decorating process, first set the resin base-material 12 on the supporting table 42 of the work-displacement robot 43 (see FIG. 1). Next, the CPU 61 retrieves from the memory 62 the laser-irradiation data for irradiating the laser L1. The CPU 61 then produces a drive-signal according to the laser-irradiation data and then emits such drive-signal to the laser-irradiating device 44, which then irradiates the infrared-laser L1 according to the drive-signal being emitted by the CPU 61. Also, the laser controller 53 of the laser-irradiating device 44 irradiates the laser L1 from the laser generator 51 and controls the laser deflector 52 according to the pattern of the given image data. Such control determines the irradiating position and the focal point of the infrared laser L1. All of the above controls make it possible to conduct a certain laser irradiation to form a group of laser-processed grooves of the multiple laser-processed grooves 22, 32, thus providing a certain pattern, as shown in FIG. 2, and therefore providing a fine decoration on the surface of the automobile interior-part 11.

In the laser-decorating process, the laser-irradiation is conducted specifically in the following order.

Figure 6:
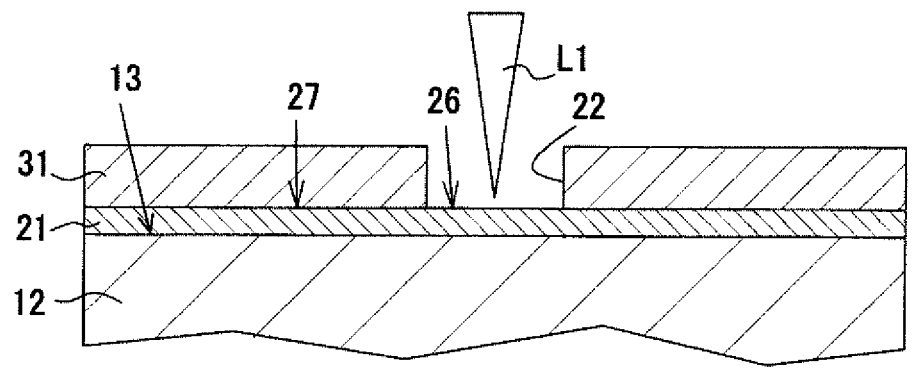
FIG. 6 is the enlarged cross-sectional view of the main part that explains the manufacturing process of the automobile interior-part as an embodiment of this invention.
Figure 7:
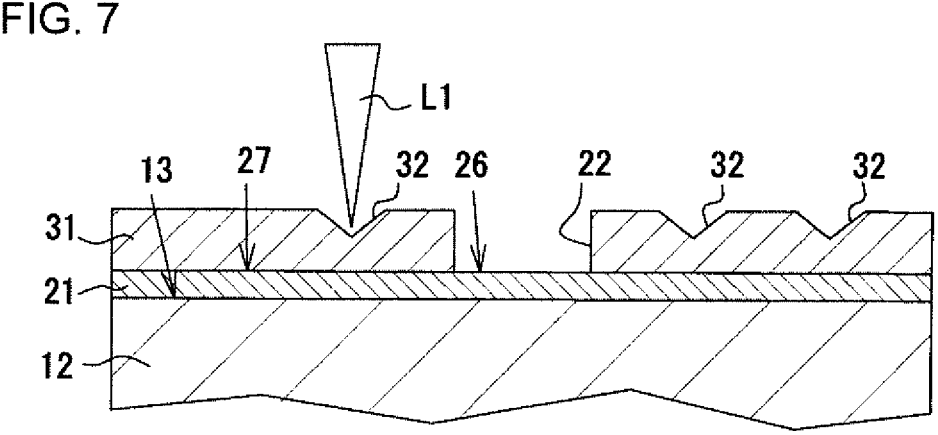
FIG. 7 is the enlarged cross-sectional view of the main part that explains the manufacturing process of the automobile interior-part as an embodiment of this invention.

Firstly, make the first laser-processed groove 22 that penetrates the surface coat-layer 31, to expose partially the base coat-layer 21, by irradiating the infrared laser L1 onto the surface coat-layer 31 (see FIG. 6). Then, without penetrating the surface coat-layer 31, make the second laser-processed groove 32, which is shallower than the first laser-processed groove 22, on the surface coat-layer 31 by irradiating the infrared laser L1 onto the surface of said surface coat-layer 31 (see FIG. 7). The above ordered process prevents smoke and soot from gathering in the second laser-processed groove 32, while forming the first laser-processed groove 22, which brings the advantage of eliminating the possibility of gloss-deterioration.

Figure 8:
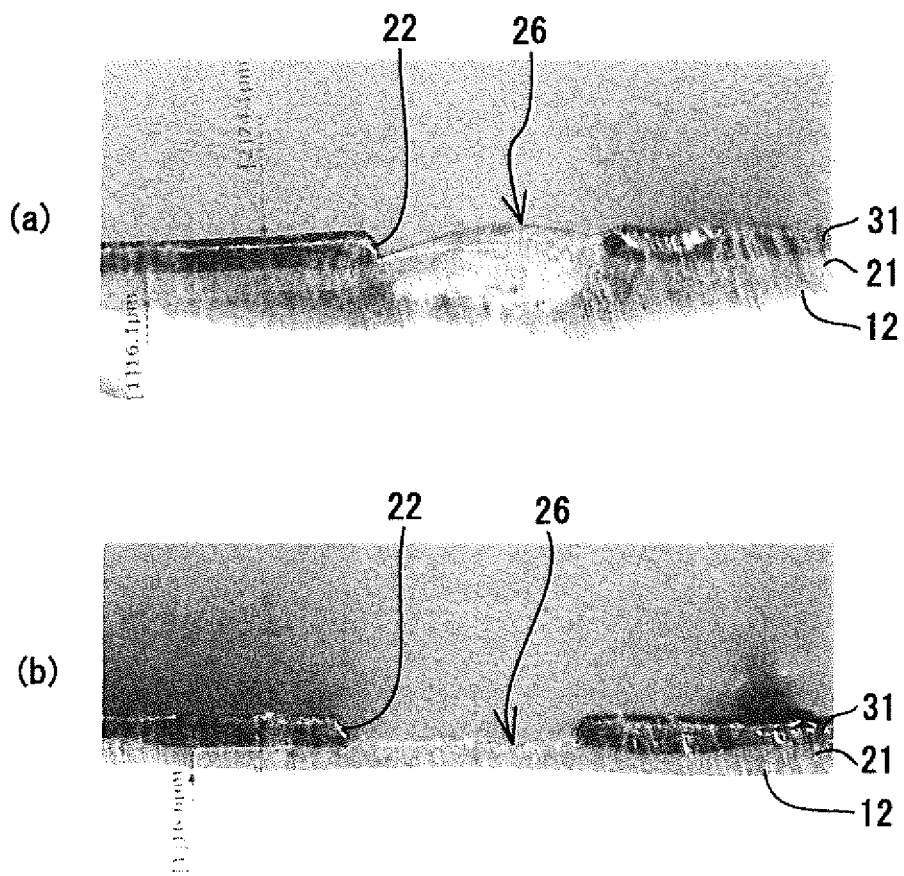
FIG. 8 shows a photograph (a): of an enlarged cut-section of the first laser-processed groove of the conventional automobile interior-part and a photograph (b): of an enlarged cut-section of the first laser-processed groove of the automobile interior-part as an embodiment of this invention.
Figure 9:
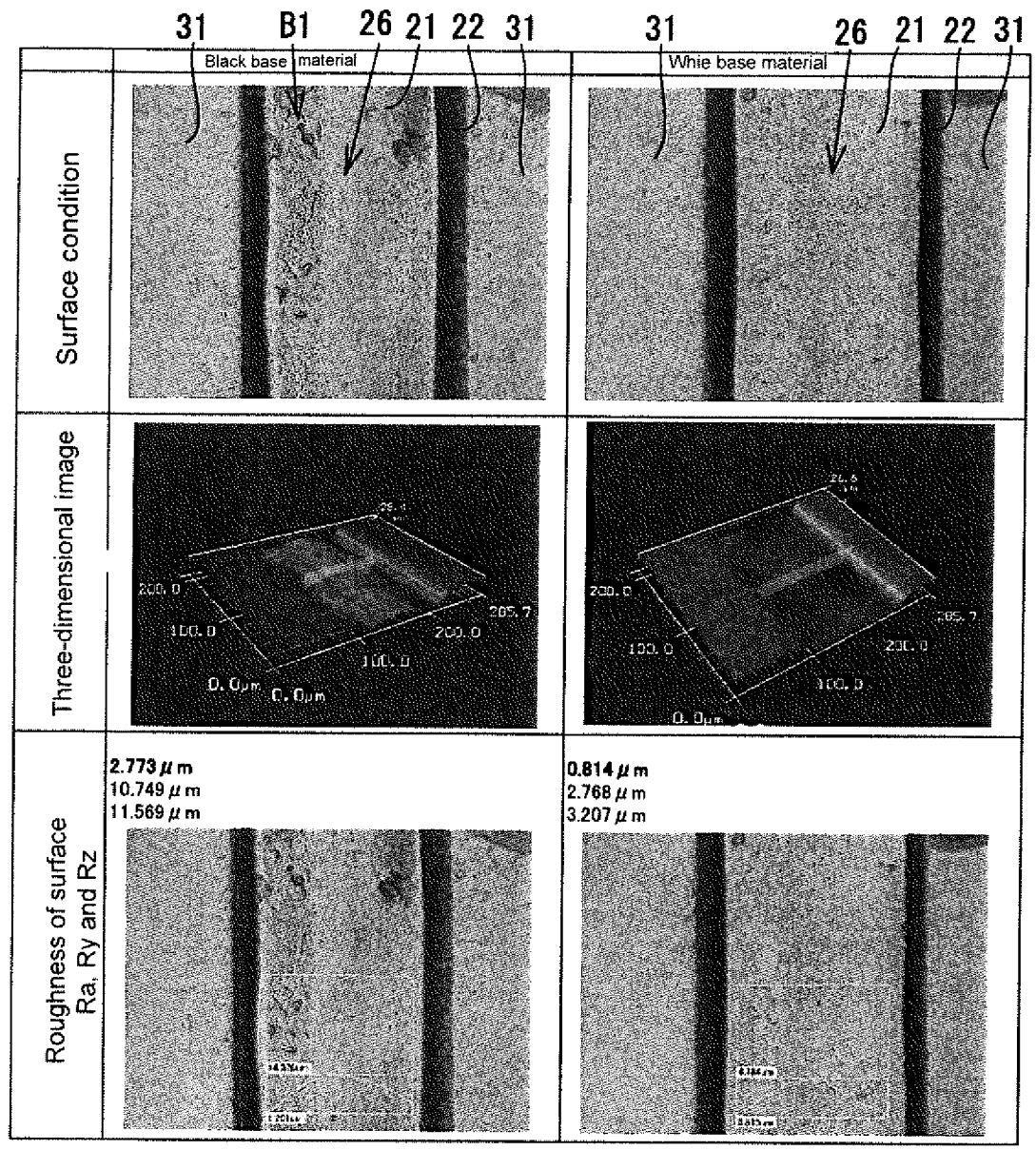
FIG. 9 shows photographs (in the left column) of the enlarged plan-view and of the three-dimensional image of the first laser-processed groove of the conventional automobile interior-part and shows (in the right column) photographs of the enlarged plan-view and of the three-dimensional image of the first laser-processed groove of the automobile interior-part as an embodiment of this invention.
Figure 10:
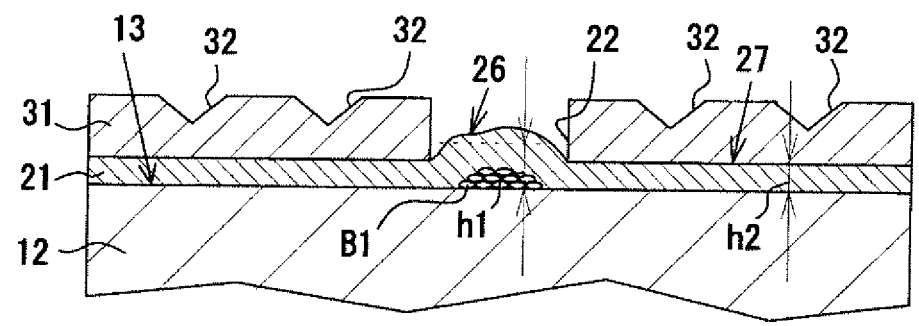
FIG. 10 is an enlarged cross-sectional view of the main-part of the conventional automobile interior-part as a comparative example.

The automobile interior-part 11 as the embodiment of this invention, and a comparative example of the conventional automobile interior-part, were actually made and observed. The result is as follows:

FIG. 8 shows a photograph (a) of an enlarged cut-section of the first laser-processed groove 22 of a conventional automobile interior-part, and a photograph (b) of an enlarged cut-section of the first laser-processed groove 22 of the automobile interior-part 11 as an embodiment of this invention. FIG. 9 shows photographs (in the left column) of the enlarged plan-view and of the three-dimensional image of the first laser-processed groove 22 of a conventional automobile interior-part and shows (in the right column) photographs of the enlarged plan-view and of the three-dimensional image of the first laser-processed groove 22 of the automobile interior-part 11 as an embodiment of this invention. FIG. 10 is an enlarged cross-sectional view of the main part of the conventional automobile interior-part as a comparative example. The only difference from the embodiment of this invention is that the color of the resin base-material of the conventional one, here, is black.

As shown in FIGS. 8(a) and 10, it was identified in the comparative example of the conventional automobile interior-part that the exposed area 26 of the base coat-layer 21 at the bottom of the first laser-processed groove 22 bulges, that the surface-flatness of the exposed area 26 is less realized, and that an air-foam B1 is formed on the surface of the resin base-material 12 beneath the base coat-layer 21 of the exposed area 26 of the base coat-layer 21, which may suggest a deterioration of the adhesion between the resin base-material 12 and the base coat-layer 21. The laser-microscope determination of the surface-roughness of the exposed area 26 of the base coat-layer 21 showed that the arithmetic-average roughness (Ra) was 2.773 μm, that the maximum height (Ry) was 10.749 μm, and that the ten-point average roughness (Rz) was 11.569 μm respectively. Also, the planar-view microscope-determination of the exposed area 26 identified that the formed air-foam B1 deteriorates the surface of the exposed area 26 (see the left column of FIG. 9). The planar view unaided observation of the comparative example of the conventional automobile-interior-part showed that the red color of the exposed area 26 was unclear and of a less high contrast.

Contrarily, as shown in FIGS. 2, 3 and 8(b), it was identified in the automobile interior-part 11 as the embodiment of this invention that the surface of the exposed area 26 of the base coat-layer 21 at the bottom of the first laser-processed groove 22 is not bulged, that the flatness of the exposed area 26 is realized, that such realized flatness is kept at a high level, and that there is not an air-foam B1 formed at all on the surface of the resin base-material 12 beneath the base coat-layer 21 at the bottom of the exposed area 26, which means that the adhesion between such resin base-material 12 and base coat-layer 21 is kept in a preferable state. The laser-microscope determination of the surface-roughness of the exposed area 26 of the base coat-layer 21 showed that the arithmetic-average roughness (Ra) was 0.814 μm, that the maximum height (Ry) was 2.768 μm, and that the ten-point average roughness (Rz) was 3.207 μm, which were obviously less than the values of the comparative example. The planar-view unaided determination of the comparative example of the automobile interior-part 11 of this invention showed that the surface condition of the exposed area 26 was extremely good (see the right column of FIG. 9). The planar view unaided observation of the automobile interior-part 11 of this invention showed that the red color of the exposed area 26 was clear and of a high contrast.

Therefore, the following effects can be achieved by the embodiments of this invention.

(1) In the manufacturing process of the automobile interior-part 11 as an embodiment of this invention, a resin base-material 12 colored in a highly light color at a lightness-level of 70 or more or a clear-and-colorless resin base-material 12 is used, with the result that the heat of the infrared laser L1 is not readily absorbed into the resin base-material 12 in the laser-decorating process. In other words, the resin base-material 12 made of a resin material that is colored white, milky-white, grayish-white or ivory or the like at a lightness-level of 70 or more allows the heat of the infrared laser L1 irradiated to be reflected and not absorbed. Also, the resin base-material 12 made of a clear-and-colorless resin material allows the heat of the infrared laser L1 irradiated to pass through said resin and not be absorbed. Thus, this type of resin base-material 12 prevents the resin from being gasified, thus preventing an air-foam B1 bulge from readily forming on the surface 13 of the resin base-material. Therefore, the flatness of the exposed area 26 of the base coat-layer 21 at the bottom of the first laser-processed groove 22 is realized. As a result, the exposed area 26 shows a clear color and a high contrast, thus making it possible to obtain an automobile interior-part 11 with an excellent design. Also, the adhesion of the base coat-layer 21 against the resin base-material 12 does not lessen, thus making it possible to obtain a reliable decorated-part 11.

(2) In the laser-decorating process of the method for manufacturing the embodiment of this invention, in addition to the first laser-processed groove 22, the second laser-processed groove 32 is made, so that a complex and fine design can be expressed, thus making it possible to improve the excellency of the design.

(3) In the laser-decorating process of the method for manufacturing an embodiment of this invention, the second laser-processed groove 32 is made after the first laser-processed groove 22 is made. If the first laser-processed groove 22 of a relatively deep groove is made later than the second laser-processed groove 32 of a relatively shallow groove, then more gas is produced in the making of the first laser-processed groove 22, which causes soot and smoke to gather in the second laser-processed groove 32, which could result in less gloss of the second laser-processed groove 32. Contrarily, the embodiment of this invention that the first laser-processed groove 22 is started to be made in advance of the second laser-processed groove 32 prevents smoke and soot from gathering in the second laser-processed groove 32, which eliminates the risk of gloss-deterioration, thus making it possible to obtain a high-quality-designed automobile interior-part 11 of a clear second-laser-processed groove 32.

(4) The automobile interior-part 11 as an embodiment of this invention comprises the base coat-layer 21 colored in red as a chromatic color and the surface coat-layer 31 colored in black and to be formed on the base coat-layer 21. Of this automobile interior-part 11, the first laser-processed groove 22 penetrates the surface coat-layer 31 to expose partially the base coat-layer 21, while the second laser-processed groove 32 that is shallower than the first laser-processed groove 22 does not penetrate the surface coat-layer 31. Also, of the exposed area 26 of the base coat-layer 21, the arithmetic-average roughness (R1) is 2 µm or less, the maximum height (Ry) is 7 µm or less, and the 10-points average roughness (Rz) is 8 µm or less, which makes the flatness of the exposed area 26 realized, thus making it possible to achieve an exposed area 26 with distinctive coloring and high contrast.

(5) Of the automobile interior-part 11 as an embodiment of this invention, the average value in the height h1 from the surface 13 of the resin base-material 12, as the standard point, up to the surface of the exposed area 26, is within the preferable range of 100 or more and 130 or less (specifically approximately 100), under the condition that the height h2 from the surface 13 of the resin base-material 12, as the standard point, up to the surface of the non-exposed area 27, is 100. Contrarily, of the comparative example of the conventional automobile interior-part, the height h1 greatly exceeds the above preferable range (specifically over 150). In other words, the height of the bulge of the exposed area 26 of the automobile interior-part 11 of this invention, compared to the comparative example, is obviously very low, with the flatness of the exposed area realized, which makes the coloring of such an area distinctive and the contrast greater.

(6) Of the automobile interior-part 11 as an embodiment of this invention, the thickness D1 (see FIG. 3) of the surface coat-layer 31 is greater than the thickness D2 of the base coat-layer 21. Making the thickness D1 of the surface coat-layer 31 less than the thickness D2 of the base coat-layer 21 may make it impossible to provide the function of the surface coat-layer 31 as being a sufficient protective layer on the uppermost surface of the surface coat-layer 31. In addition, the thickness of the base coat-layer 21 should be minimal, since the base coat-layer 21 is simply for providing contrast. Increasing the thickness of the base coat-layer 21 unnecessarily may result in higher costs in production. On the contrary, the embodiment of this invention that the thickness D1 of the surface coat-layer 31 is greater than the thickness D2 of the base coat-layer 21 can provide the function of the surface coat-layer 31 as being a protective layer on the uppermost surface of the surface coat-layer 31 and can prevent an increase of unnecessary thickness of the base coat-layer 21, thus making it possible to avoid higher costs in production. As such, the first laser-processed groove 22 and the second laser-processed groove 32 are readily made respectively, thus making it possible to avoid higher costs in production.

Each embodiment of this invention can be modified, as described below.

As described in the above embodiment of this invention, the base coat-layer 21 is colored in red. However, it is possible to color it in another chromatic color (e.g. in blue, green, brown, orange, purple, yellow or the like).

Figure 11:
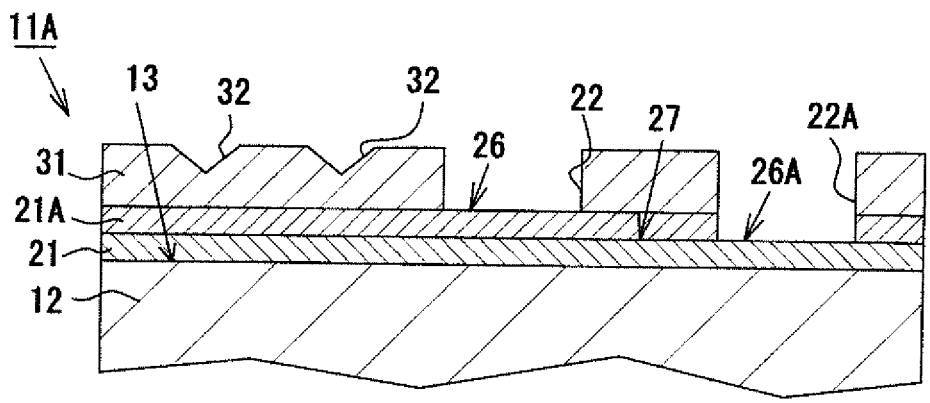
FIG. 11 is an enlarged cross-sectional view of the main-part of the automobile interior-part as another embodiment of this invention.

As described in the above embodiment of this invention, the base coat-layer 21 is only a single coat-layer colored in red. However, double coat-layers can be adapted as another embodiment of the automobile interior-part 11A, which is shown in FIG. 11. That is, this automobile interior-part 11A has a double base coat-layer 21, 21A, with the base coat-layer 21 colored in red set beneath the base coat-layer 21A colored in blue. The red base coat-layer 21 has the feature of not easily absorbing the infrared-laser L1 compared to the blue base coat-layer 21A. Also, two types of the first laser-processed grooves 22, 22A and one type of the second laser-processed groove 32 are made on this automobile interior-part 11A. The first laser-processed groove 22 penetrates the surface coat-layer 31 to expose partially the blue base coat-layer 21A, while the other laser-processed groove 22 penetrates the surface coat-layer 31 and the blue base coat-layer 21A to expose partially the red base coat-layer 21. In any case of the exposed area 26A of the base coat-layer 21 and of the exposed area 26 of the base coat-layer 21A, the Ra is 2 µm or less, the Ry is 7 µm or less, and the Rz is 8 µm or less, with such exposed areas 26A, 26 being quite flat. As such, this automobile interior-part 11A comprises the two colors of the exposed area 26, 26A being of distinctive coloring and of great contrast. Instead of using the blue base coat-layer 21A, it is possible to use a base coat-layer 21A of another color that absorbs the energy of the infrared laser L1 more easily than the color red and one that contains a chromatic color-pigment other than blue. Furthermore, it is possible to use a base coat-layer 21A that contains a mixture of silver pigment and of black pigment in a certain proportion.

As described in the above embodiment of this invention, the $YVO_4$ laser is used. However, it is not limited to that. The laser processing can be done using another solid-state laser that can irradiate the infrared laser L1 (e.g. a YAG laser, a ruby laser or the like).

As described in the embodiment of this invention, the method for manufacturing decorative parts is embodied in the method for manufacturing component parts such as an armrest of a door as one of the automobile interior parts. However, it is possible to be embodied in this method for manufacturing decorative parts other component parts of automobile interior parts such as console boxes, instrument panels, sensor clusters, cup holders, glove compartments, upper boxes or safety-assist handles or the like. Besides automobile interior parts, this invention can be naturally embodied as a method for manufacturing decorative parts such as automobile exterior parts (e.g. radiator grills, emblems, mud guards or the like) or for manufacturing the decorative veneers of furniture, electric appliances or the like. In the case that this invention refers to the automobile interior part, such interior part should be provided preferably in the place for example where the light-emitting means is covered, specifically, a cover part (armrest) around the power-window switches or the like. Here, in the case that the resin base-material 12 is clear and colorless, the light emitting from the light-emitting means provided at the back of the part penetrates the exposed area 26, and then such a light can be viewed from the back of the part, thus making it possible to achieve an interesting design effect. On the contrary, in the case that the resin base-material 12 is white, milky-white, grayish-white or ivory at a lightness-level of 70 or more, that is, non-transparent, the light emitting from such a light-emitting means provided at the back of the part can be blocked. Therefore, it is preferable to use such part in a place where it is necessary to prevent the light from streaming out of the light-emitting means.

Besides the technical ideas of this invention, as described above, other technical ideas to be understood are described hereinafter.

(1) According to any one of the first through eleventh aspects as described above, the surface roughness (Ry) of the exposed area at the bottom of the first laser-processed groove of the base coat-layer is 7 μm or less.

(2) According to any one of the first through eleventh aspects as described above, the surface roughness (Rz) of the exposed area at the bottom of the first laser-processed groove of the base coat-layer is 8 μm or less.

(3) According to any one of the first through eleventh aspects as described above, there is no bulge between the surface of the resin base-material and the base coat-layer as the bottom-most layer.

(4) According to any one of the first through eleventh aspects as described above, of the colored base coat-layer, the adhesion-intensity of the area at the bottom of the first laser-processed groove is the same as that of the area not at the bottom of the first laser-processed groove.

(5) According to any one of the first through eleventh aspects as described above, the base coat-layer is red.

(6) According to any one of the first through eleventh aspects as described above, the base coat-layer is made of two layers. The lower layer is colored in red, and the upper layer is colored in blue.

(7) According to any one of the first through eleventh aspects as described above, the thickness of the surface coat-layer is 20 μm to 40 μm, and the thickness of the base coat-layer is 10 μm to 20 μm.

(8) According to any one of the first through eleventh aspects as described above, the decorated-part is provided in the place where the light-emitting means is covered.

(9) According to any one of the first through eleventh aspects as described above, the decorated-part is the automobile interior-part of which the main surface is curved into convexity.

(10) According to any one of the first through eleventh aspects as described above, the decorated-part is a covering-part around the power-window switches.

11, 11A: Automobile interior-part as the decorated-part
12: Resin base-material
13: Surface of the resin base-material
21, 21A: Base coat-layer
22, 22A: First laser-processed groove
26, 26A: Exposed area
27: Non-exposed area
31: Surface coat-layer
32: Second laser-processed groove
D1: Thickness of the base coat-layer
D2: Thickness of the surface coat-layer
h1: Height from the surface of the resin base-material as the standard point up to the surface of the non-exposed area
h2: Height from the surface of the resin base-material as the standard point up to the surface of the exposed area
L1: Infrared laser
w1: Width of the first laser-processed groove
w2: Width of the second laser-processed groove

The invention claimed is:

1. A decorated-part of which a fine decoration is provided on a surface thereof by a laser-processed groove, characterized by comprising:
a resin base-material colored in one of white, a clear-and-colorless resin base-material, or a resin base-material using a natural ABS resin containing no pigment;
at least one base coat-layer, colored in a chromatic color, formed on the surface of the resin base-material;
a surface coat-layer, colored in black, formed on the base coat-layer, the surface coat-layer comprising first laser-processed grooves that penetrate said surface coat-layer and partially exposes the base coat-layer whereof the roughness (Ra) of the exposed area at the bottom of the first laser-processed groove of the base coat-layer is 2 μm or less, the surface coat-layer comprising second laser-processed grooves that do not penetrate said surface coat-layer,
wherein a surface of base coat-layer in the exposed area is generally flat as a result of an absence of an air foam on a surface of the resin base-material below the exposed area, the absence of the air foam a result of the base-material being beneath the at least one base coat-layer and not readily absorbing heat during laser-processing of the laser-processed groove, and
wherein the surface coat layer further comprises:
a plurality of first drawn patterns of rectangular shape; and
a plurality of second drawn patterns of rectangular shape;
each of the first drawn patterns including the second laser processed grooves, the second laser processed grooves drawn in parallel and extending obliquely upward to the right in plan view for each of the first drawn patterns;
each of the second drawn patterns including the second laser processed grooves, the second laser processed grooves drawn in parallel and extending obliquely upward to the left in plan view for each of the second drawn patterns;
the first and second drawn patterns adjacent to each other on the surface coat-layer.

2. A decorated-part according to claim 1, characterized in that the thickness of the surface coat-layer that is greater than that of the base coat-layer.

3. A decorated-part according to claim 1, characterized in that the width of the first laser-processed groove is greater than that of the second laser-processed grooves.

4. A decorated-part according to claim 1, wherein the black of the surface coat-layer is derived by adding carbon black pigment to the surface coat-layer.

* * * * *